US010551264B2

(12) United States Patent
Grant et al.

(10) Patent No.: US 10,551,264 B2
(45) Date of Patent: Feb. 4, 2020

(54) PIEZOELECTRIC ULTRASONIC DETECTOR

(71) Applicant: Honeywell International Inc., Morris Plains, NJ (US)

(72) Inventors: Michael Ethan Grant, Wareham (GB); Jeffrey Cutler, Poersmouth (GB)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 98 days.

(21) Appl. No.: 15/548,470

(22) PCT Filed: Jan. 29, 2016

(86) PCT No.: PCT/US2016/015517
§ 371 (c)(1),
(2) Date: Aug. 3, 2017

(87) PCT Pub. No.: WO2016/126533
PCT Pub. Date: Aug. 11, 2016

(65) Prior Publication Data
US 2018/0017458 A1 Jan. 18, 2018

Related U.S. Application Data

(60) Provisional application No. 62/111,407, filed on Feb. 3, 2015.

(51) Int. Cl.
G01L 9/08 (2006.01)
G01M 3/26 (2006.01)
G01H 11/08 (2006.01)

(52) U.S. Cl.
CPC .............. *G01L 9/08* (2013.01); *G01M 3/26* (2013.01); *G01H 11/08* (2013.01)

(58) Field of Classification Search
CPC ............. G01L 9/08; G01M 3/26; G01H 11/08
See application file for complete search history.

(56) References Cited

U.S. PATENT DOCUMENTS 5,946,273 A * 8/1999 Lissel ................. B06B 1/0292
367/181
6,669,690 B1 * 12/2003 Okada ............ A61B 17/320092
606/169

(Continued)

FOREIGN PATENT DOCUMENTS

AU 2013206304 A1 7/2013
AU 2016215624 A2 9/2017

(Continued)

OTHER PUBLICATIONS

PCT Application No. PCT/US20161015517, International Search Report, dated Apr. 15, 2016, 4 pages.

(Continued)

Primary Examiner — Justin Seo
Assistant Examiner — John M Royston
(74) Attorney, Agent, or Firm — Wick Phillips Gould & Martin, LLP

(57) ABSTRACT

Embodiments relate generally to an ultrasonic detector, and methods of making the ultrasonic detector. The ultrasonic detector may comprise a piezoelectric element operable to convert the pressure of sound waves from mechanical energy into electric signal; a protective cover; a hot melt adhesive; one or more layers of solder; one or more perforated metal electrodes comprising openings filled with the solder; and one or more support elements. The ultrasonic detector may also comprise one or more casing elements operable to enclose and house the other elements of the ultrasonic detector; a printed circuit board (PCB) operable to receive ultrasonic data from the piezoelectric element and electrodes, wherein the electrodes connect to, or contact, the PCB; and an insulator located in proximity to the electrodes, and operable to prevent shorting between the metal electrodes and the metal casing elements.

20 Claims, 3 Drawing Sheets

(56) References Cited

U.S. PATENT DOCUMENTS

| | | | |
|---|---|---|---|
| 2006/0116584 A1* | 6/2006 | Sudol | A61B 8/12 600/459 |
| 2006/0125353 A1 | 6/2006 | Boecking | |
| 2011/0120209 A1* | 5/2011 | Rose | G01M 3/243 73/1.82 |
| 2012/0266690 A1 | 10/2012 | Ozaki et al. | |
| 2013/0047743 A1 | 2/2013 | Sonnenberg et al. | |
| 2016/0008850 A1* | 1/2016 | Kim | B06B 1/0622 310/317 |
| 2016/0051226 A1* | 2/2016 | Hong | B06B 1/0292 600/459 |
| 2018/0172472 A1 | 6/2018 | Grant et al. | |

FOREIGN PATENT DOCUMENTS

| | | |
|---|---|---|
| CA | 2975256 A1 | 8/2016 |
| CN | 202382752 U | 8/2012 |
| CN | 203568132 U | 4/2014 |
| CN | 107209053 A | 9/2017 |
| CN | 108225686 A | 6/2018 |
| EP | 3254071 A1 | 12/2017 |
| EP | 3339854 A1 | 6/2018 |
| WO | 2014133211 A1 | 9/2014 |
| WO | 2016126533 A1 | 8/2016 |

OTHER PUBLICATIONS

PCT Application No. PCT/US2016/015517, Written Opinion of the International Searching Authority, dated Apr. 15, 2016, 6 pages.
PCT Application No. PCT/2016/015517, International Preliminary Report on Patentability, dated Aug. 18, 2017, 8 pages.
Europe Patent Application No. 17206856.1, Extended European Search Report, dated May 9, 2018, 8 pages.
PCT Application No. PCT/US2016/015517, International Search Report, dated Apr. 15, 2016, 4 pages.

* cited by examiner

PIEZOELECTRIC ULTRASONIC DETECTOR

CROSS-REFERENCE TO RELATED APPLICATIONS

The present application claims priority to and is the National Stage of International Application No. PCT/US2016/015517 (entitled PIEZOELECTRIC ULTRASONIC DETECTOR filed on Jan. 29, 2016,) which claims priority to U.S. Provisional Patent Application Ser. No. 62/111,407 (entitled PIEZOELECTRIC ULTRASONIC DETECTOR filed Feb. 3, 2015), both of which is incorporated herein by reference.

STATEMENT REGARDING FEDERALLY SPONSORED

RESEARCH OR DEVELOPMENT

Not applicable.

REFERENCE TO A MICROFICHE APPENDIX

Not applicable.

BACKGROUND

Leakage of gas from gas installations, pipe lines and their components might be very dangerous for the environment, and human and animal health, especially if the gas is toxic, flammable or corrosive. If such gas leak happens e.g. as an accident, it is important to detect the leak as soon as possible. The leak may also be quantitatively measured to determine if the leak is above certain threshold value for alarm, and also to determine any further steps that should be taken to stop the leak. Therefore, gas detectors may be used in areas where this potential for gas leaks.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Leakage of gas from gas installations, pipe lines and their components might be very dangerous for the environment, as well as human and animal health, especially if the gas is toxic, flammable or corrosive. If such a gas leak happens, for example as an accident, it needs to be detected as soon as possible, and quantitatively measured to determine if the leak of gas is above an alarm threshold value. If the gas is above the threshold, the alarm may sound, allowing for safe evacuation. Additionally, some part of the gas installation may need to be switched off and insulated in order to stop the gas leak.

In some cases, gas leakages from pressurized source produce sound, which typically have frequencies in audible and ultrasonic range. An ultrasonic detector may be capable of detecting this ultrasound (at ultrasonic frequency), and therefore detect the gas leak. An ultrasonic detector would signal the level of this ultrasound, thereby triggering an alarm if the ultrasound level is above certain, preset threshold.

Figure 1:
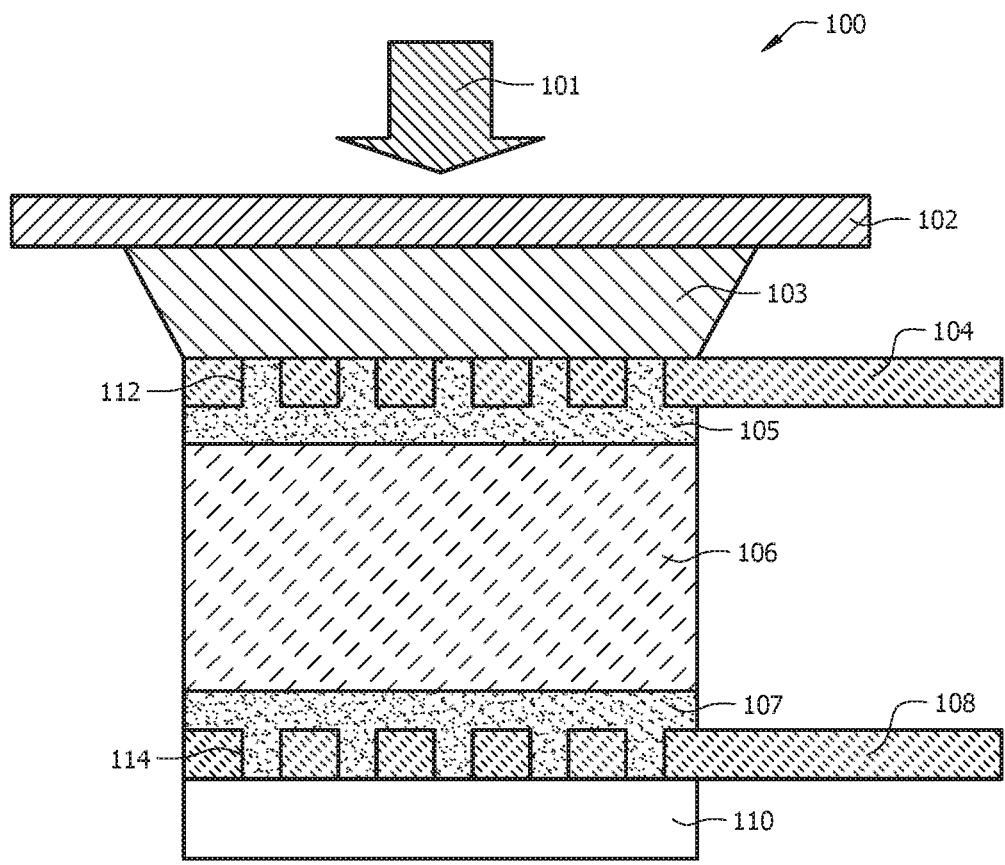
FIG. 1 illustrates a cross-sectional view of an ultrasonic detector according to an embodiment of the disclosure.

Referring to FIG. 1, an ultrasonic detector 100 is described. The ultrasonic detector 100 comprises a piezoelectric element 106 operable to convert the pressure of sound waves from mechanical energy into electric signal. The ultrasonic sound waves coming from the environment are illustrated by the arrow 101. The ultrasonic detector 100 further comprises a protective cover 102, a hot melt adhesive 103 (which may be used as an acoustic filler), one or more perforated metal electrodes 104 and 108 with openings (holes and slots) 112 and 114 filled with solder, one or more layers of solder 105 and 107, the piezoelectric sensing element 106 comprising silver electrodes, and a support 110. In some embodiments, the protective cover 102 may comprise a low density material, such as Polytetrafluoroethylene (PTFE), polyethylene (PE), or another low density material. One or more of the described elements may be attached to one another with adhesive.

The piezoelectric element 106 may be soldered to the perforated metal electrodes 104 and 108 that connect it to an electronic circuit. Perforation of the metal electrode(s) 104 and 108 allows the electrode(s) 104 and 108 to be attached to the piezoelectric element 106 in a way that provides stability for a broad range of temperatures, as these holes 112 and 114 are filled with solder material. Perforation also simplifies the soldering process, as the solder paste 105 and 107 penetrates easily through the perforated holes 112 and 114 and stops the silver electrode(s) of the piezoelectric element 106 from being dissolved in the solder during the soldering process. The hot melt adhesive 103 is used as acoustic filler for the space between the ultrasound exposed area of the piezoelectric element 106 and the protective cover 102. The molten hot melt material solidifies on contact with the piezoelectric element and casing, stopping leakage into the housing while maintaining excellent acoustic and waterproof sealing properties. Hot melt material cools in a matter of minutes allowing for a simpler manufacturing process.

Using the low density material for the protective cover 102 for the ultrasonic detector 100 is beneficial as it is resistant to many aggressive chemicals in a broad temperature range but allows the ultrasound waves to pass through to the piezoelectric element 106. In other applications, a piezoelectric element may be conductively connected to metal electrodes both with conductive glue and soldering. Applicants have discovered that perforated metal electrodes 104 and 108 soldered to the piezoelectric element 106 can survive multiple temperature shocks, which may relate to or demonstrate aging of device and the influence of the environment on it.

Figure 2A:
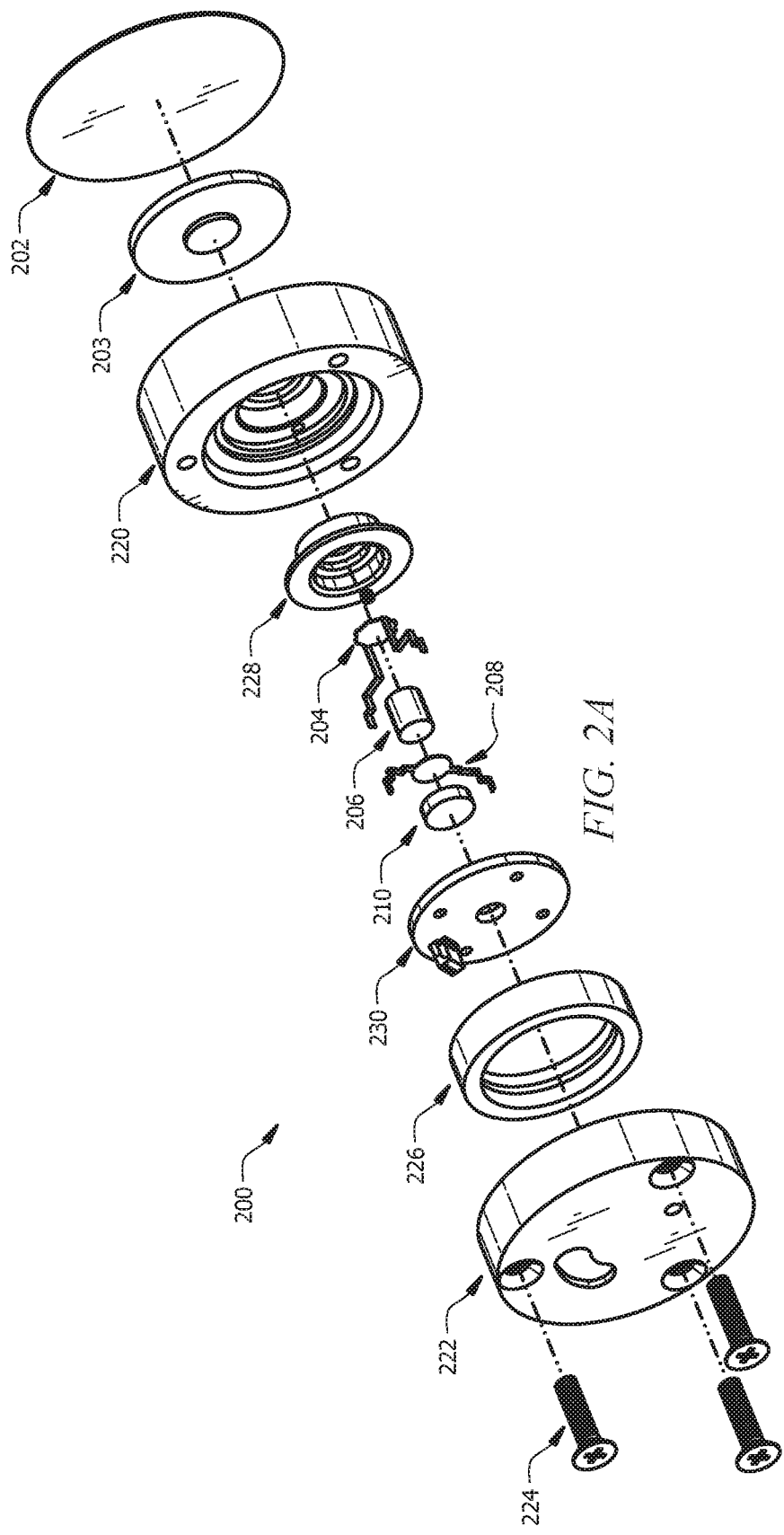
FIG. 2A illustrates an exploded view of an ultrasonic detector according to an embodiment of the disclosure.
Figure 2B:
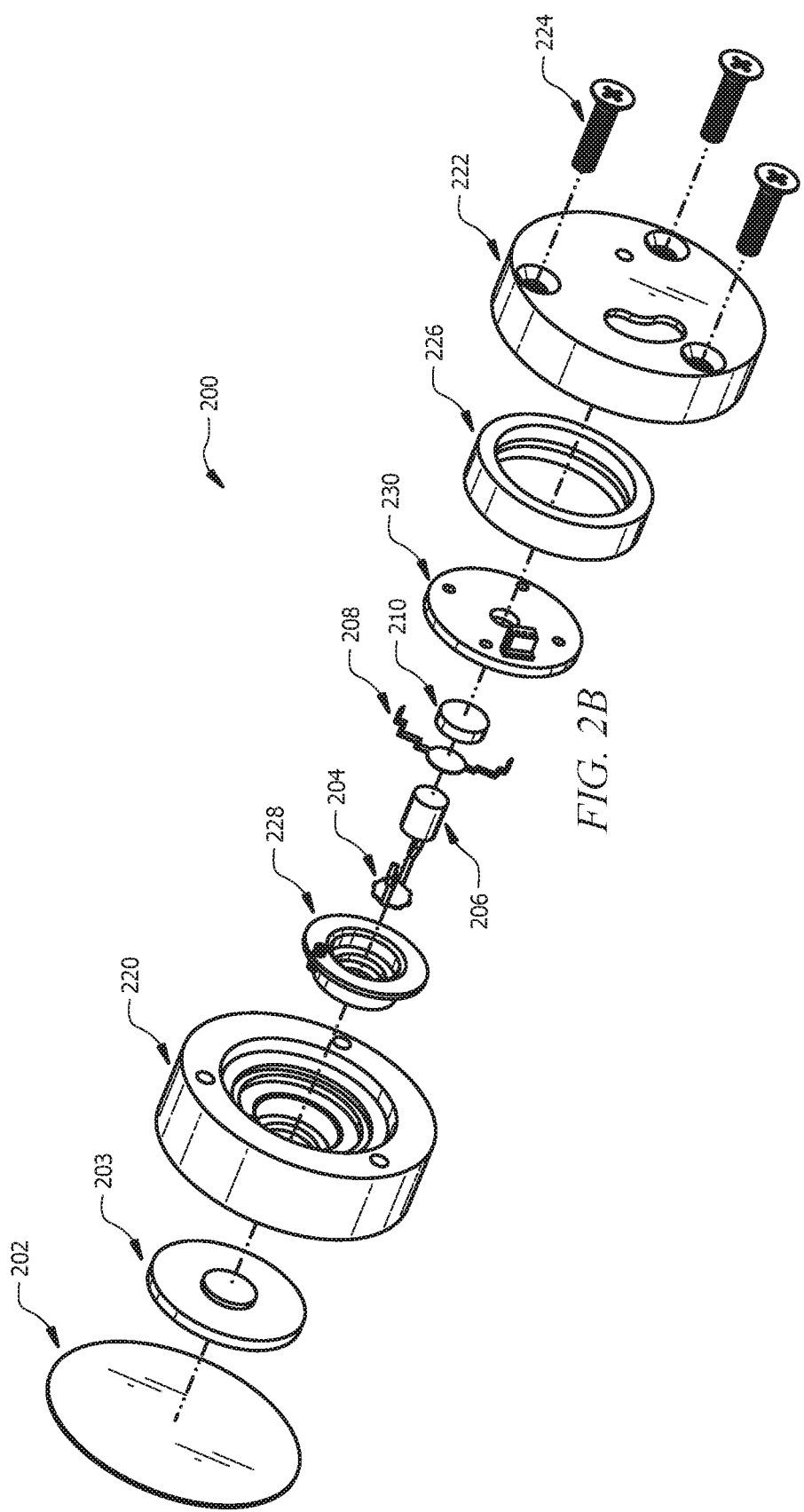
FIGS. 2B illustrate another exploded view of an ultrasonic detector according to an embodiment of the disclosure.

Referring now to FIGS. 2A-2B, two exploded views of an ultrasonic detector 200 are shown. The ultrasonic detector 200 may be similar to the ultrasonic detector 100 of FIG. 1, wherein the ultrasonic detector 200 may comprise a piezoelectric element 206, a protective cover 202, a hot melt adhesive 203 (which may be used as an acoustic filler), one or more perforated metal electrodes 204 and 208 and a support 210, wherein these elements may be similar to the piezoelectric element 106, protective cover 102, hot melt adhesive 103, perforated metal electrodes 104 and 108, and support 110 described in FIG. 1.

Additionally, the ultrasonic detector 200 may comprise one or more casing elements 220 and 222 operable to enclose and house the other elements of the ultrasonic detector 200. In some embodiments, the casing elements 220 and 222 may comprise a metal material and may be held together by one or more screws 224. In some embodiments, the ultrasonic detector 200 may comprise a printed circuit board (PCB) 230 operable to receive ultrasonic data from the piezoelectric element 206 and electrodes 204 and 208, wherein the electrodes 204 and 208 may connect to, or contact, the PCB 230. In some embodiments, the ultrasonic detector 200 may comprise supporting elements and/or insulating elements for supporting and insulating the other elements of the ultrasonic detector 200. For example, a foam support 226 may be located within the casing elements 200 and 222. Additionally, an insulator 228 (which may be made of a plastic material) may be located in proximity to the electrodes 204 and 208, and may be operable to prevent shorting between the metal electrodes 204 and 208 and the metal casing elements 220 and 222.

Soldering of the electrode(s) to the piezoelectric element may be done at temperature of +280 degrees Celsius (C) for up to 4 seconds. This temperature is beneath the Curie temperature of the piezoelectric material, which is +300 degrees C., and this protects the piezoelectric element from losing its sensitivity.

Using of a low density material as front protective layer of the ultrasonic sensor allows stopping bimetallic corrosion between the metal body of ultrasonic sensor and the metal body of the instrument enclosure, as those two might be made from different metals. The protective cover with an O-ring above it seals the ultrasonic sensor inside the main instrument enclosure.

Some embodiments of the disclosure may include one or more methods for forming an ultrasonic detector. The method may comprise providing a piezoelectric element operable to convert the pressure of sound waves from mechanical energy into electric signal; soldering the piezoelectric element to one or more perforated metal electrodes with holes and slots filled with the solder material; attaching a protective cover comprising a low density material operable to allow sound to pass through to the piezoelectric element; attaching the one or more electrodes to a printed circuit board; and assembling at least some of the above elements within a casing.

In some embodiments, attaching the protective cover may comprise attaching a hot melt adhesive between the protective cover and the piezoelectric element, wherein the hot melt adhesive is used as an acoustic filler. In some embodiments, the method may further comprise providing one or more support elements within the casing for supporting the elements and preventing movement of the elements within the casing. In some embodiments, the method may further comprise providing one or more insulating elements to insulate the metal electrodes from contacting the casing.

Embodiments of the disclosure include an ultrasonic detector comprising a piezoelectric element operable to convert the pressure of sound waves from mechanical energy into electric signal; a protective cover comprising a low density material; a hot melt adhesive used as an acoustic filler; one or more perforated metal electrodes with holes and slots filled with solder; one or more layers of solder; and one or more support elements.

In some embodiments, the ultrasonic detector may further comprise one or more casing elements operable to enclose and house the other elements of the ultrasonic detector; a printed circuit board (PCB) operable to receive ultrasonic data from the piezoelectric element and electrodes, wherein the electrodes connect to, or contact, the PCB; and an insulator (which may be made of a plastic material) located in proximity to the electrodes, and operable to prevent shorting between the metal electrodes and the metal casing elements.

In some embodiments, the casing elements are held together by one or more screws. In some embodiments, the piezoelectric element is soldered to the perforated metal electrodes, and wherein the metal electrodes connect the piezoelectric element to an electronic circuit. In some embodiments, the solder material fills the perforations, holes and slots, of the metal electrodes, allowing the electrodes to be attached to the piezoelectric element in a way that provides stability for a broad range of temperatures. In some embodiments, the hot melt adhesive is used as acoustic filler for the space between the ultrasound exposed area of the piezoelectric element and the protective cover. In some embodiments, the molten hot melt material freezes on contact with the piezoelectric element and casing stopping leakage into the housing while maintain excellent acoustic and waterproof sealing properties. In some embodiments, the protective cover comprises one of Polytetrafluoroethylene (PTFE) and polyethylene (PE). In some embodiments, the low density material of the protective cover is resistant to many aggressive chemicals in a broad temperature range but allows the ultrasound waves to pass through to the piezoelectric element. In some embodiments, soldering of the electrode(s) to the piezoelectric element is done at temperature of +280 degrees Celsius (C) for up to 4 seconds.

In some embodiments, the ultrasonic detector further comprises one or more layers of adhesive operable to attach one or more of the above elements.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An ultrasonic gas detector, comprising:
   a piezoelectric element configured to convert the pressure of sound waves from mechanical energy into electric signal;
   one or more perforated metal electrodes located proximate to the piezoelectric element and comprising a plurality of openings;
   one or more layers of solder configured to attach the one or more perforated metal electrodes to the piezoelectric element, and configured to fill the plurality of openings of the one or more perforated metal electrodes;
   a protective cover located on a first surface of the piezoelectric element and one or more perforated metal electrodes;
   a hot melt adhesive disposed between the protective cover and the piezoelectric element and configured to attach the protective cover to the first surface of the piezoelectric element and one or more perforated metal electrodes;
   an alarm device; and
   one or more support elements located proximate to the piezoelectric element and one or more perforated metal electrodes;
   wherein the ultrasonic gas detector is configured to:
      detect an ultrasound and determine if the detected ultrasound is above a preset threshold and trigger the alarm device when above the preset threshold.

2. The ultrasonic gas detector of claim 1, further comprising:
   one or more casing elements configured to enclose and house other elements of the ultrasonic detector;
   a printed circuit board (PCB) configured to receive ultrasonic data from the piezoelectric element and one or more perforated metal electrodes, wherein the one or more perforated metal electrodes connect to, or contact, the PCB; and
   an insulator located in proximity to the one or more perforated metal electrodes, and configured to prevent shorting between the one or more perforated metal electrodes and one or more metal casing elements.

3. The ultrasonic gas detector of claim 1, wherein the one or more layers of solder comprise a non-pliable metallic material configured to transfer pressure applied to one or more elements of the ultrasonic detector.

4. The ultrasonic gas detector of claim 1, wherein the piezoelectric element is soldered to the one or more perforated metal electrodes, and wherein the one or more perforated metal electrodes connect the piezoelectric element to an electronic circuit.

5. The ultrasonic gas detector of claim 1, wherein the one or more layers of solder fills perforations of the of the one or more perforated metal electrodes, allowing the one or more perforated metal electrodes to be attached to the piezoelectric element in a way that provides stability for a broad range of temperatures.

6. The ultrasonic gas detector of claim 1, wherein the hot melt adhesive is used as acoustic filler for a space between the ultrasound exposed area of the piezoelectric element and the protective cover.

7. The ultrasonic gas detector of claim 6, wherein the hot melt material solidifies on contact with the piezoelectric element and casing stopping leakage into a housing while maintain excellent acoustic and waterproof sealing properties.

8. The ultrasonic gas detector of claim 1, wherein the protective cover comprises one of Polytetrafluoroethylene (PTFE) and polyethylene (PE).

9. The ultrasonic gas detector of claim 1, wherein the protective cover resists diffusion of many aggressive chemicals in a broad temperature range but allows ultrasound waves to pass through to the piezoelectric element.

10. The ultrasonic gas detector of claim 1, wherein soldering of the one or more perforated metal electrodes to the piezoelectric element is done at temperature of 280 degrees Celsius (° C.) for up to 4 seconds.

11. The ultrasonic gas detector of claim 1, wherein the ultrasonic detector comprises a pressure detector.

12. A method for forming an ultrasonic gas detector, comprising:
providing a piezoelectric element configured to convert the pressure of sound waves from mechanical energy into electric signal;
soldering the piezoelectric element to one or more perforated metal electrodes with openings, wherein one or more layers of the solder fills the openings of the one or more perforated metal electrodes;
attaching a protective cover to the piezoelectric element, wherein attaching the protective cover comprise attaching a hot melt adhesive between the protective cover and the piezoelectric element, and wherein the protective cover allows sound to pass through the piezoelectric element;
attaching the one or more perforated metal electrodes to a printed circuit board;
assembling at least casing element within a casing;
detecting an ultrasound and determining if the detected ultrasound is above a preset threshold and triggering an alarm device when the detected ultrasound is above the preset threshold.

13. The method of claim 12, further comprising providing one or more support elements within the casing for preventing movement of the elements within the casing.

14. The method of claim 12, further comprising providing one or more insulating elements to insulate the one or more perforated metal electrodes from contacting the casing.

15. The method of claim 12, wherein the hot melt adhesive is used as an acoustic filler.

16. An ultrasonic gas detector, comprising:
a piezoelectric element configured to convert the pressure of sound waves from mechanical energy into electric signal;
one or more perforated metal electrodes located proximate to the piezoelectric element and comprising a plurality of openings;
one or more layers of solder configured to attach the one or more perforated metal electrodes to the piezoelectric element, and configured to fill the plurality of openings of the one or more perforated metal electrodes;
a protective cover located on a first surface of the piezoelectric element and one or more perforated metal electrodes;
a hot melt adhesive disposed between the protective cover and the piezoelectric element and configured to attach the protective cover to the first surface of the piezoelectric element and one or more perforated metal electrodes;
one or more support elements located proximate to the piezoelectric element and one or more perforated metal electrodes;
one or more casing elements configured to enclose and house other elements of the ultrasonic detector;
a printed circuit board (PCB) configured to receive ultrasonic data from the piezoelectric element and one or more perforated metal electrodes, wherein the one or more perforated metal electrodes at least contact the PCB; and
an insulator located in proximity to the one or more perforated metal electrodes, and configured to prevent shorting between the one or more perforated metal electrodes and one or more metal casing elements;
an alarm device, wherein the ultrasonic gas detector is configured to:
detect an ultrasound and determine if the detected ultrasound is above a preset threshold and trigger the alarm device when above the preset threshold.

17. The ultrasonic gas detector of claim 16, wherein the piezoelectric element is soldered to the one or more perforated metal electrodes, and wherein the one or more perforated metal electrodes connect the piezoelectric element to an electronic circuit.

18. The ultrasonic gas detector of claim 16, wherein the one or more layers of solder fills the openings of the one or more perforated metal electrodes, allowing the one or more perforated metal electrodes to be attached to the piezoelectric element in a way that provides stability for a broad range of temperatures.

19. The ultrasonic gas detector of claim 16, wherein the hot melt adhesive is used as acoustic filler for a space between an ultrasound exposed area of the piezoelectric element and the protective cover.

20. The ultrasonic gas detector of claim 16, wherein the insulator comprises a plastic material.

* * * * *